United States Patent [19]

Mori

[11] 4,386,366
[45] May 31, 1983

[54] ADAPTIVE TYPE QUANTIZER

[75] Inventor: Sumio Mori, Asaka, Japan

[73] Assignee: Fuji Photo Film Co. Ltd., Kanagawa, Japan

[21] Appl. No.: 244,478

[22] Filed: Mar. 16, 1981

[30] Foreign Application Priority Data

Mar. 26, 1980 [JP] Japan ................................ 55-38408

[51] Int. Cl.³ ............................................. H04N 7/12
[52] U.S. Cl. .................................... 358/135; 358/260; 375/30
[58] Field of Search ................. 358/13, 133, 135, 136, 358/260; 375/26, 30, 31

[56] References Cited

U.S. PATENT DOCUMENTS 2,916,553 12/1959 Crowley .................................. 375/30
4,179,710 12/1979 Ishigoro et al. ..................... 358/135
4,292,651 9/1981 Kretz et al. ......................... 358/135

Primary Examiner—Joseph A. Orsino, Jr.
Attorney, Agent, or Firm—Sughrue, Mion, Zinn, Macpeak and Seas

[57] ABSTRACT

A method for adaptively equalizing sampled input picture element values in which an estimation error obtained from a sampled input picture element value and the estimation value thereof are adaptively quantized by selecting one of a plurality of quantization characteristics. Quantization steps are determined in accordance with the desired quantization characteristics. Input groups of picture elements are divided into adjacent blocks and a quantization characteristic used for succeeding blocks is determined according to the distribution of quantization level values of preceding blocks. A quantization characteristic selecting unit selects a quantization characteristic set by the quantization characteristic determining unit from among a plurality of quantization characteristics. The estimation errors are quantized in a predetermined block using the quantization characteristic which is so selected.

2 Claims, 4 Drawing Figures

FIG. 2

| QUANTIZATION CHARACTERISTIC | | | | | | | | |
|---|---|---|---|---|---|---|---|---|
| 1 | | 2 | | 3 | | 4 | | |
| ESTIMATION ERROR RANGE | QUANTIZATION LEVEL VALUE | ESTIMATION ERROR RANGE | QUANTIZATION LEVEL VALUE | ESTIMATION ERROR RANGE | QUANTIZATION LEVEL VALUE | ESTIMATION ERROR RANGE | QUANTIZATION LEVEL VALUE | QUANTIZATION STEP | QUANTIZATION CODE |
| 10~ | 13 | 20~ | 26 | 40~ | 52 | 80~ | 104 | 4 | 011 |
| 5~9 | 7 | 10~19 | 14 | 20~39 | 28 | 40~79 | 56 | 3 | 010 |
| 2~4 | 3 | 4~9 | 6 | 8~19 | 12 | 16~39 | 24 | 2 | 001 |
| 0~1 | 0 | -1~3 | 0 | -3~7 | 0 | -7~15 | 0 | 1 | 000 |
| -1~-2 | -1 | -2~-5 | -2 | -4~-11 | -4 | -8~-23 | -8 | -1 | 100 |
| -3~-5 | -4 | -6~-11 | -8 | -12~-23 | -16 | -24~-47 | -32 | -2 | 101 |
| -6~-10 | -8 | -12~-21 | -16 | -24~-43 | -32 | -48~-87 | -64 | -3 | 110 |
| -11~ | -14 | -22~ | -28 | -44~ | -56 | -88~ | -112 | -4 | 111 |

ADAPTIVE TYPE QUANTIZER

BACKGROUND OF THE INVENTION

The present invention relates to an estimation coding system for efficiently transmitting or storing an image of variable density. More specifically, the invention relates to an adaptive type quantizer which controls quantization characteristics according to variations of input picture elements.

A variety of coding compression systems have been proposed in the art which are intended to reduce the transmission time and the transmission cost in transmitting an image of variable density in a narrow bandwidth. One of the conventional systems is a DPCM (Differential Pulse Code Modulation) system. In accordance with that system, the picture element value for a present point is estimated from past picture element values and the estimation error, which is the difference between the estimation value and the picture element value of the present point, is quantized and coded thus achieving the desired bandwidth compression. In general, in such an estimation coding system, in order to improve the compression effect, nonlinear quantization is employed to make the quantization step intervals small when the estimation error is small and larger when the estimation error is large taking into account the visual characteristic that visual sensitivity is low for an image area where the density changes abruptly but is sufficiently high for an image area of fairly uniform density and the number of quantization steps is made as small as possible.

However, if the number of quantization steps is made excessively small, the quantization error is increased as a result of which the system cannot sufficiently respond to abrupt variations in density of an input image thereby causing gradient overload noise in the reproduced image. Accordingly, in order to prevent the above-described degradation of an image between areas of variable density areas of fairly uniform density, an adaptive type quantization system in which the quantization characteristic is varied adaptively according to the variations of input image values has been proposed in which a quantization characteristic having a large quantization level value is used when the input image value varies greatly and a quantization characteristic having a small quantization level value is used when the input image value varies less.

In one of the conventional systems of this type, the quantization characteristic is determined with the present quantization level value being used to estimate the quantization level value for the next picture element. Accordingly, the quantization characteristic varies for almost all the input picture elements with the result that the reproduced image is greatly degraded.

This difficulty has been eliminated by another conventional system in which quantization level values corresponding to input picture elements are monitored for a certain period of time and the quantization characteristic is changed when required. However, the conventional system is also disadvantageous in that, as described above, while the quantization level values variable with time are being monitored, a change of the quantization characteristic is watched for. Accordingly, when the quantization level value changes extremely frequently, the quantization characteristic is also frequently changed. In this case, the probability of selecting a quantization characteristic of large quantization step interval for input picture elements to be quantized is considerably high although a quantization characteristic of a small quantization step interval should be selected therefor so that the reproduced image is significantly degraded.

Furthermore, these conventional systems are disadvantageous in that propagation therein is greatly affected by the transmission error according to the degree of variation of the quantization characteristic.

SUMMARY OF THE INVENTION

The invention has been developed to eliminate the above-described difficulties accompanying a conventional system. In accordance with the invention, based on the fact that in any image, one area thereof is very similar to its immediately adjacent areas, an image is divided into blocks having a suitable size and, according to the distribution of quantization level values in one block, a quantization characteristic for the next block is selected. Especially where the blocks of the image are spatially adjacent to one another, an area of each block is similar to adjacent areas and therefore the probability of erroneously selecting a quantization characteristic for the next block is very low.

With the invention, instead of monitoring the quantization level values of input picture elements, the quantization level values are detected, as a whole, for each block, and accordingly the quantization characteristic is not unstably changed. Accordingly, erroneous selection of the quantization characteristic is infrequent with the result that degradation of the reproduced image is prevented. As the percentage of correctly selecting the quantization characteristic is high, the coding operation can be carried out with high efficiency. Furthermore, as the quantization characteristic is selected for every block, the adaptive type quantizer according to the invention is advantageous in that it is scarcely affected by error propagation due to transmission errors.

More specifically, provided according to the invention is an adaptive type quantizer in which an estimation error from a sampled input picture element value and the estimation value thereof are adaptively quantized and coded by selecting one of a plurality of quantization characteristics. According to the invention, the quantization characteristics have suitably determined quantization steps, a group of input picture elements is divided into block each having a plurality of picture elements. The quantizer includes a quantization characteristic determining unit for determining, according to the distribution of quantization level values provided when the estimation errors in one block are quantized with a selected quantization characteristic, a quantization characteristic to be used for the next block; a quantization characteristic selecting unit for selecting a quantization characteristic determined by the quantization characteristic determining unit out of the plurality of quantization characteristics; and a quantizer for quantizing the estimation errors in a relevant block using the quantization characteristic which is selected by the quantization characteristic selecting unit.

BRIEF DESCRIPTION OF THE DRAWINGS

FIG. 2 is a diagram showing plural quantization characteristics by way of example;

DESCRIPTION OF THE PREFERRED EMBODIMENTS

The invention will be described with reference to the accompanying drawings.

Figure 1:
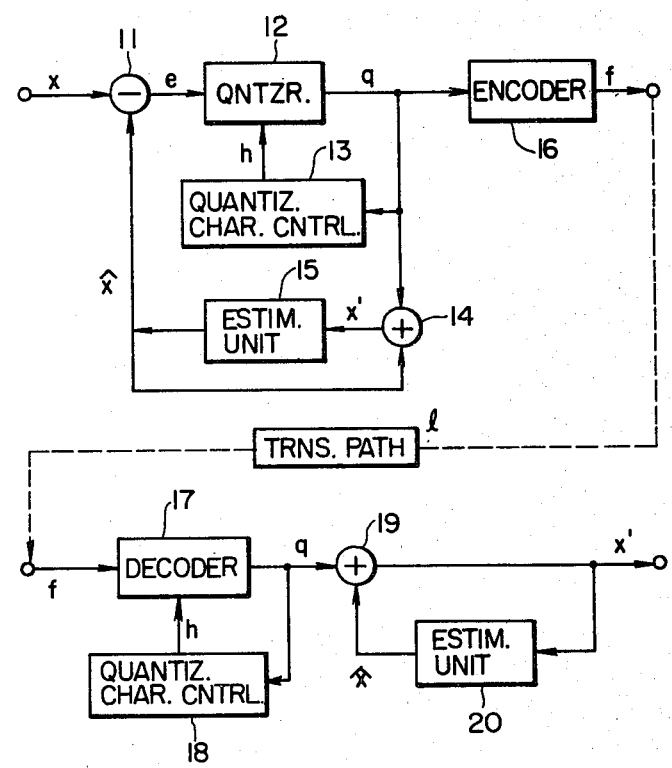
FIG. 1 is a block diagram showing a general estimation coding system having an adaptive type quantizer.

FIG. 1 is a block diagram of a general estimation coding system having an adaptive type quantizer of the invention, in which the upper portion of the figure is a block diagram of a coding device and the lower portion a decoding device.

In FIG. 1, a subtractor 11 operates to calculate an estimation error e which is the difference between the present input picture element value $\hat{x}$ and an estimation value x which is an estimate of the present input picture element value from past picture element values.

A quantizer 12 employs a predetermined number of quantization steps and a selected one out of a plurality of quantization characteristics having quantization level values in the predetermined quantization steps to perform quantization according to the estimation error e to provide a quantization level value q.

A quantization characteristic controller 13 operates to select a suitable quantization characteristic according to the magnitude of the quantization level value q and to apply its quantization characteristic selection signal h to the quantizer 12. The quantizer 12 uses the quantization characteristic thus selected to quantize the estimation error at the next picture element. The operation of the quantization characteristic controller 13 will be described in detail later.

The quantization level value q is added to the estimation value $\hat{x}$ by an adder 14 as a result of which a reproduction picture element value x' for estimating the next picture element value is provided. The reproduction picture element value x' differs from the input picture element value x by the value of the quantization error.

An estimating unit 15 operates to estimate the next input picture element value from a plurality of past reproduction picture element values x' to calculate the aforementioned estimation value $\hat{x}$. The estimation equation in this case is a four-point estimation equation which is for instance:

$$x = a_1 x'_{m,n-1} + a_2 x'_{m-1,n-1} + a_3 x'_{m-1,n} + a_4 x'_{m-1,n+1}.$$

An encoder 16 encodes the quantization level value q with a code predetermined for a quantization level value, as shown in FIG. 2, into an output signal f. The output signal f is transmitted through a transmission path l to the decoding device.

In the encoder in the upper portion of FIG. 1, the received signal f is decoded by a decoder 17 into the quantization level value q according to a procedure which is opposite to that followed by the encoder 16.

Even if the received signal f which has been encoded has the same code, the quantization level value for the code differs according to the quantization characteristic employed. Accordingly, the decoder 17 operates to obtain a quantization level value using a quantization characteristic which has been selected from among the plural quantization characteristics according to the past quantization level value. The quantization characteristic is selected by a quantization characteristic controller 18 which is completely the same in operation as the above-described quantization characteristic controller 13. The quantization level value q thus decoded is added to the estimation value $\hat{x}$ estimated from the past reproduction picture element value by an adder 19 to provide a reproduction picture element value x' for the present point. An estimating unit 20 outputs an estimation value x' for the next reproduction picture element using a plurality of past reproduction picture elements according to the above-described four-point estimation equation, for instance.

FIG. 2 shows a plurality of quantization characteristics and codes corresponding to the quantization level values of the quantization characteristics, by way of example. In FIG. 2, reference numeral 21 designates quantization characteristic symbols which indicate four quantization characteristics in this example. For each quantization characteristic, the estimation error ranges, the quantization level values and the quantization steps are provided merely for purposes of description and the actual data employed should be suitably determined as required. A 3-bit code, having a fixed code length, is provided for each quantization level value in FIG. 2 although this code may be replaced by a variable length code suitable for use as an entropy code if desired.

Figure 3:
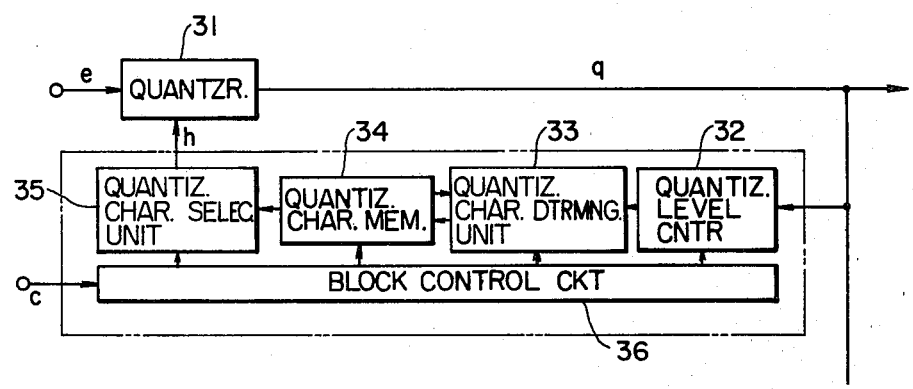
FIG. 3 is a block diagram showing an example of an adaptive type quantizer according to the invention.

FIG. 3 is a block diagram of an adaptive type quantizer of the invention. For simplification in description, it is assumed that in an input image, each line has 512 picture elements, and the 512 picture elements are divided into 16 blocks each having 32 picture elements. That is, each line has 16 blocks each having 32 picture elements.

In FIG. 3, reference numeral 31 designates a quantizer for quantizing an estimation error e and reference numeral 36 a block control circuit which counts pulses of a clock signal c provided in synchronization with an input picture element to provide block addresses 1, 2, 3, ... and 16. The block control circuit 36, which has an initial value "0" for every line, outputs the block addresses 1, 2, 3, ... and 16 whenever it counts 32 clock pulses.

A quantization characteristic memory 34 has sixteen memory units the number of which corresponds to the number of blocks of each line with a quantization characteristic symbol for a block stored in the relevant address.

A quantization level value counter 32 operates to sense the distribution of successively inputted quantization level values in the relevant blocks. For simplification of description, it is assumed that the counter 32 operates to perform its counting operation only when the quantization level value is 0 in FIG. 2.

The quantization level value counter 32 is reset whenever the block address is renewed by the block control circuit 36 and performs its counting operation only when the quantization level value is 0. The count value of the counter 32 is applied to a quantization characteristic determining unit 33 whenever the block address is changed to determine a quantization characteristic to be used for the same block in the next line. This operation will be described with reference to the following Table 1:

TABLE 1

| h | ~50 | ~60 | ~70 | ~80 | ~90 | ~100 |
|---|-----|-----|-----|-----|-----|------|
| 1 | 2   | 2   | 2   | 1   | 1   | 1    |
| 2 | 3   | 3   | 2   | 2   | 1   | 1    |

TABLE 1-continued

| h | ~50 | ~60 | ~70 | ~80 | ~90 | ~100 |
|---|-----|-----|-----|-----|-----|------|
|   |     |     | %   |     |     |      |
| 3 | 4   | 3   | 3   | 2   | 2   | 2    |
| 4 | 4   | 4   | 3   | 3   | 2   | 2    |

In Table 1, the column headings indicate the percentage of generation of quantization level value 0 as the distribution of quantization level values in one block, the row headings indicate a quantization characteristic symbol (cf. FIG. 2) used at present in the relevant block, and the listed values indicates a quantization characteristic symbol to be used for the same block in the next line. For instance, in the case where the percentage of generation of quantization level value 0 in a block is in a range of from 71 to 80% and the quantization characteristic symbol 3 is used for the block, a quantization characteristic symbol to be used for the same block in the next line is 2. This means that the present quantization characteristic is somewhat coarse and therefore a smaller quantization characteristic is to be used for the same block in the next line.

As is apparent from the above description, referring to the count value of the quantization level valve counter 32 for the present block and to the quantization characteristic symbol for the present block in the quantization characteristic selection memory 34, the quantization characteristic determining unit 33 determines a quantization characteristic symbol to be used for the same block in the next line according to Table 1. The quantization characteristic symbol thus determined is stored, as the value for the same block in the next line, in the memory unit in the quantization characteristic selection memory 34 which is specified by the relevant block address.

A quantization characteristic selecting unit 35 operates to receive from the quantization characteristic selection memory 34 a quantization characteristic symbol addressed (with block address +1) to apply the quantization characteristic symbol for the relevant block to be quantized to the quantizer 31 or to change the quantization characteristic so that a quantization characteristic corresponding to the quantization characteristic symbol is used by the quantizer 31.

The above-described operation can be summarized as follows. For the first line of an image, the quantization characteristic selection memory 34 sets a standard quantization characteristic in all of the sixteen memory units the number of which is equal to the number of block. From the second line on, the memory 34 determines from the quantization level value distribution obtained from the quantization characteristic used for the present block a quantization characteristic for the same block in the next line and stores it in the relevant address. Thus, for each block, the estimation error is quantized by selecting the quantization characteristic which is obtained by referring to the quantization characteristic selection memory.

In the above-description, the quantization level 0 is counted for every block. Whenever the quantization level 0 is counted for every block, a determination is made for a quantization characteristic to be used for the same block in the next line. However the following method may be employed. The quantization level value counter 32 is provided with buffer memories in a number equal to the number of blocks with the count values of quantization level value 0 for the blocks being stored in the buffer memories. When one line of the input image has been recorded, referring to the count values in the buffer memories and the quantization characteristic symbols in the quantization characteristic selection memory 34 for the blocks, the quantization characteristic determining unit 33 determines quantization characteristics to be used next and changes the quantization characteristic symbols in the quantization characteristic selection memory 34 for the blocks. In addition, the quantization level value counter 32 may be so designed to count at a particular value instead of the quantization level value 0.

Furthermore, the circuit may be so modified that the quantization level value counter 32 is provided with counter units, the number of which is suitably determined from the number of quantization steps, so as to count the quantization level values, respectively, and that the quantization characteristic determining unit 33 determining quantization characteristics for the relevant blocks from the distribution of the count values of the quantization level values. In this case, the percentage of generation in Table 1 is indicated as a value representative of the variation of quantization level value in a block.

Figure 4:
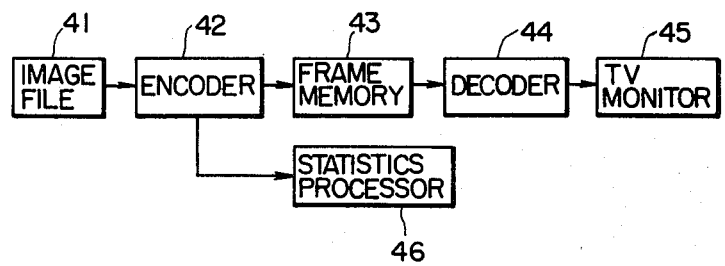
FIG. 4 is a block diagram showing an image simulator used for performing the simulation in the invention.

Now, the effects of the invention obtained through simulation will be described. FIG. 4 is a block diagram showing a simulator which is employed to perform the simulation according to the invention. The simulator, as shown in FIG. 4, includes an image file 41, an encoding processing section 42 of the invention as described above with reference to FIGS. 1 and 3, a frame memory 43 for storing an encoded image corresponding to the transmission path 1 in FIG. 1, a decoding processing section 44 of the invention as described above with reference to FIGS. 1 and 3, a television monitor 45 for displaying a reproduced image, and a statistical processing section 46 for calculating an image entropy ($H = -\Sigma P_i \log_2 P_i$, where $P_i$ is the probability of generation of each quantization step) and the frequency of use of each quantization characteristic.

In the case where an input image having pictures and characters (text) mixed and occupying halves of an image area, the relevant data is as follows. The resultant outputs of the statistical processing section 16 were as indicated in the parts (a) and (b) of the following Table 2. The part (a) indicates the entropies of the picture and character areas in the case where the quantization characteristics are employed individually and adaptively. It should be noted that, in this case, the estimating unit (FIG. 1) conducts the one-dimensional estimation for every four lines (K factor of four) and the two-dimensional estimation for the other lines.

The part (b) of Table 2 indicates the frequencies of use of the quantization characteristics in the case where the quantization characteristics are of the adaptive type. The quantization characteristic symbols in Table 2 are the same as those in FIG. 2, the adaptive type being within the conditions of Table 1.

TABLE 2

| Quantization characteristic symbol | 1 | 2 | 3 | 4 | Adaptive type | |
|---|---|---|---|---|---|---|
| (a) Picture | 1.97 | 1.26 | 0.72 | 0.37 | 1.28 | Bits/ |
| Characters | 2.05 | 1.81 | 1.36 | 0.86 | 1.47 | picture element |
| (b) Picture | 14.8 | 24.6 | 9.9 | 0.7 | | |
| Characters | 21.8 | 8.9 | 9.0 | 10.3 | | |

As is clear from Table 2, if a quantization characteristic having a large quantization step interval is used, the entropy is decreased and the compression effect is improved. However the resolution of the image is greatly decreased.

In the case of the picture of the example, the quantization characteristic symbol "2" may be used for areas of the picture of greatly variable density. However, if the symbol 2 is employed for areas of fairly uniform density which vary smoothly, the quality of image is significantly lowered. For reproduced characters, the reproduced image is sufficiently high in quality even with the symbol "3". However, if the symbol "1" is used, the resultant image is fuzzy or unclear because the device cannot sufficiently respond to the abrupt variations in the characters.

That is, if in order to improve an image such as that in the example uniformly over the entire image, the symbol "2" is, for instance, used for the entire area of the image, then the quantization is insufficient to produce an acceptable image quality in the relatively uniform and smoothly varying areas of the picture and inefficient in compression effect for the character areas. In this case, the average entropy is 1.54 bits/picture-element.

On the other hand, in accordance with the invention, the image is divided and quantization characteristics suitable for local features of the image are employed. Accordingly, the average entropy is reduced to 1.37 bits/picture-element which results in efficient quantization which provides an image the entire area of which is of high image quality and produces an excellent compression effect.

Thus, in the case of the adaptive type quantization characteristic, as is apparent from Table 2, part (b), the symbols "1" and "2" are relatively frequently used for picture areas while the symbol "1" is frequently used for the character areas because of its large blank positions while for complex characters, the symbol "2", "3" or "4" is preferably used. It is also apparent that the more intricate the image, the more frequently the symbols "3" and "4" are used.

As is apparent from the above description, the system of the invention, unlike the conventional system, operates stably in the selection of the quantization characteristics, and accordingly the resolution of the resultant image is scarcely lowered and the quantization is performed suitably for local features of an image. Thus, the system of the invention is considerably effective in encoding all the areas of an image thus providing a high compression effect. The system of the invention, unlike the conventional system, is greatly effective especially in processing an image in which pictures and text or areas of abruptly variable density and areas of smoothly varying density are mixed.

What is claimed is:

1. A method for adaptively quantizing sampled input picture element values in which an estimation error obtained from a sampled input picture element value and the estimation value thereof are adaptively quantized by selecting one of a plurality of quantization characteristics, comprising the steps of:

determining quantization steps for said quantization characteristics;

dividing a group of input picture elements in to m adjacent blocks each having a plurality of picture elements for every line on an image, m quantization characteristic selection memories being provided in correspondence to said m blocks;

setting with a quantization characteristic determining unit, according to the distribution of quantization level values provided when said estimation errors in one of said blocks are quantized with a selected quantization characteristic, a quantization characteristic to be used for the next block; and selecting with a quantization characteristic selecting unit a quantization characteristic set by said quantization characteristic determining unit out of said plurality of quantization characteristics, wherein for every block in a line to be quantized, said quantization characteristic to be used for the corresponding block in the next line is set by said quantization characteristic determining unit according to the distribution of said quantization level values in said block and the current quantization characteristic set to store a quantization characteristic symbol to be used at a predetermined address in said quantization characteristic selection memories, and wherein in quantizing each block, said quantization characteristic selecting unit refers to said quantization characteristic symbols stored in said predetermined address corresponding to said block in said quantization characteristic selection memories to select a quantization characteristic for said block; and quantizing said estimation errors in a predetermined block using said quantization characteristic which is selected by said quantization characteristic selecting unit.

2. The method as claimed in claim 1 wherein said quantization characteristic determining unit, according to the distribution of quantization level values in one block, sets a quantization characteristic for the next block or for the same block in the next line, selects a quantization characteristic having a more coarse quantization step interval than a quantization characteristic used for the present block when a distribution d of quantization level values in a relevant block is larger than a threshold value $\alpha$, a quantization characteristic having a finer quantization step interval than a quantization characteristic used for the present block when the distribution d is smaller than a threshold value $\beta$, and a quantization characteristic used for the present block when the distribution d is between said threshold values $\alpha$ and $\beta$.

* * * * *